(12) United States Patent
Park et al.

(10) Patent No.: US 7,758,132 B2
(45) Date of Patent: Jul. 20, 2010

(54) BRAKING HYDRAULIC CIRCUIT FOR CONTROLLING LINEAR REDUCTION OF FRONT/REAR WHEEL BRAKING LIQUID PRESSURE AND SOLVING DIFFERENCE IN GRADIENT OF FRONT/REAR WHEEL BRAKING PRESSURE IN VEHICLE

(75) Inventors: Jong Won Park, Seoul (KR); Soung Jun Park, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 542 days.

(21) Appl. No.: 11/669,422

(22) Filed: Jan. 31, 2007

(65) Prior Publication Data
US 2008/0136249 A1    Jun. 12, 2008

(30) Foreign Application Priority Data
Dec. 7, 2006    (KR) ............... 10-2006-0123455

(51) Int. Cl.
*B60T 8/40* (2006.01)
(52) U.S. Cl. ............... 303/116.1; 303/113.1; 303/113.2
(58) Field of Classification Search ............. 303/10, 303/11, 113.1, 113.2, 113.3, 113.5, 116.1, 303/116.2, 119.2
See application file for complete search history.

(56) References Cited
U.S. PATENT DOCUMENTS 5,246,280 A * 9/1993 Sigl .................. 303/113.2
5,275,476 A * 1/1994 Maisch ................ 303/113.2
5,605,385 A * 2/1997 Zaviska et al. ........... 303/116.2
5,927,828 A * 7/1999 Beck ................... 303/116.2
6,623,088 B2 * 9/2003 Roden et al. ............ 303/113.1
6,758,537 B2 * 7/2004 O'Dea et al. ........... 303/119.1
6,957,872 B2 * 10/2005 Moradmand et al. ..... 303/116.2

FOREIGN PATENT DOCUMENTS

JP    2000-289598    10/2000
JP    2002-067907    3/2002

OTHER PUBLICATIONS

English Language Abstract of JP 2000-289598.
English Language Abstract of JP 2002-067907.

* cited by examiner

*Primary Examiner*—Thomas J Williams
(74) *Attorney, Agent, or Firm*—Edwards Angell Palmer & Dodge LLP; Peter F. Corless; Kongsik Kim

(57) ABSTRACT

The present invention relates to a braking hydraulic circuit for linear pressure reduction of a front/rear wheel braking liquid pressure in a vehicle. On a liquid pressure return line formed between wheel cylinders and a master cylinder, a two-system liquid pressure control circuit separately passes liquid pressures to be discharged from the wheel cylinders and then unifies the liquid pressures. The liquid pressure control circuit has normal open type solenoid valves and normal close type solenoid valves. Therefore, at the time of implementation of ABS (Antilock Brake System) or TCS (Traction Control System), linear control of a front/rear wheel braking liquid pressure can be realized. In addition, a difference in pressure intensification gradient according to a difference in generation time between the front and rear wheels can be eliminated.

9 Claims, 5 Drawing Sheets

BRAKING HYDRAULIC CIRCUIT FOR CONTROLLING LINEAR REDUCTION OF FRONT/REAR WHEEL BRAKING LIQUID PRESSURE AND SOLVING DIFFERENCE IN GRADIENT OF FRONT/REAR WHEEL BRAKING PRESSURE IN VEHICLE

CROSS-REFERENCE TO RELATED APPLICATIONS

The present application is based on, and claims priority from, Korean Application Serial Number 10-2006-0123455, filed on Dec. 7, 2006, the disclosure of which is hereby incorporated by reference herein in its entirety.

FIELD OF THE INVENTION

The present invention relates to a braking hydraulic circuit for a vehicle, and in particular, to a braking hydraulic circuit for controlling linear reduction of a front/rear wheel braking liquid pressure and solving a difference in gradient of a front/rear wheel braking liquid pressure in a vehicle.

BACKGROUND OF THE PRESENT INVENTION

In general, a braking system that brakes a running vehicle using a hydraulic pressure for increasing a driver's control force of a brake pedal adopts a simple method that holds rotating wheels to stop the rotation. In this case, however, it is difficult to implement optimum braking performance according to running states of the vehicle and road conditions.

Accordingly, there are used various technologies and methods that control a braking liquid pressure at the time of braking in order to overcome the limitation of the simple braking system and to improve safety of the vehicle.

For example, the following systems can be applied: ABS (Antilock Brake System) that appropriately adjusts a braking pressure to be applied to wheels according to a slip ratio calculated from a wheel speed, thereby preventing locking of the wheels; TCS (Traction Control System) that adjusts a driving force of an engine in order to prevent an excessive slip at the time of sudden start or rapid acceleration of the vehicle; and ESP (Electronic Stability Program) that minimizes a difference between a desired vehicle running direction and an actual vehicle running direction and keeps a vehicle running direction according to a driver's intension under any driving conditions.

Such a braking pressure control is implemented by providing various solenoid valves on a hydraulic circuit formed between a wheel cylinder for holding and restricting a disk wheel and a master cylinder for generating a hydraulic pressure, and controlling a path from the master cylinder to the wheel cylinder and a return path from the wheel cylinder to master cylinder.

At this time, a controller (typically, an ECU (Engine Control Unit) is applied) is used for liquid pressure control on the hydraulic circuit, in addition to control of electrical components for implementing a braking operation. That is, the controller reads the wheel speed and the like, then performs arithmetic, analysis, and judgment according to an internal control program, and subsequently performs the pressure control on a hydraulic line by driving an oil pump or the like, in addition to on/off control of the solenoid valves.

However, with the simple on/off control of the solenoid valves, at the time of implementing the ABS or the TCS, there is a limitation in that a braking pressure cannot be controlled to have a desired pressure gradient. For this reason, in order to implement precise liquid pressure control, there is needed a technology that controls the solenoid valves in a PWM (Pulse Width Modulation) method, and implements a braking pressure to have a pressure gradient according to a braking state of a vehicle at the time of braking.

Meanwhile, in the PWM control, known on/off type solenoid valves cannot be applied, and thus it is necessary to separately develop solenoid valves that can be controlled to perform a desired operation in the PWM method. For this reason, costs for development and mass, production may be required. Then, upon application, competitiveness may be weakened in terms of the costs.

In addition, at the time of normal braking, that is, when the ABS or the TCS does not operate, there is a phenomenon that a difference in pressure intensification gradient occurs due to a difference in generation time of a braking pressure between front and rear wheels. In this case, even though PWM control type solenoid valves are applied to the braking hydraulic circuit, the above phenomenon is not solved. Accordingly, there is a limitation in that unstability at the time of braking cannot be thoroughly solved.

SUMMARY OF THE PRESENT INVENTION

An embodiment of the present invention helps to overcome the drawbacks inherent in the related art and provide a braking hydraulic circuit that, even though an on/off type solenoid valve is applied, can control a pressure gradient according to a braking state of a vehicle without requiring time and costs for development of a separate PWM type solenoid valve, with implementation of a function of controlling a pressure reduction gradient according to a PWM method when the ABS operates.

Another embodiment of the present invention provides a braking hydraulic circuit. The braking hydraulic circuit can perform a braking operation during pressure reduction control of an ABS or a TCS by providing an accumulator for temporarily storing a discharged liquid pressure while forming normal close type solenoid valves double, which form a two-system liquid pressure flow for separately passing liquid pressures to be discharged from wheel cylinders and then unifying the liquid pressures, on a liquid pressure return line formed between wheel cylinders and a master cylinder. As a result, it is possible to eliminate a difference in pressure intensification gradient according to a difference in generation time of a braking pressure between front and rear wheels and thus solving braking unstability.

A braking hydraulic circuit according to an embodiment of the present invention includes a liquid pressure supply line, supply path control valves, a liquid pressure return line, return path control valves, a TCS liquid pressure supply line, and a controller.

The liquid pressure supply line supplies a liquid pressure from a master cylinder to wheel cylinders of wheels at the time of braking according to an operation of a brake pedal by a driver and at the time of normal braking with no application of an ABS.

The supply path control valves are normal open type solenoid valves and are provided on the liquid pressure supply line so, as to control a flow of a hydraulic pressure to be supplied from the master cylinder to the wheel cylinders of the wheels.

The liquid pressure return line is formed so as to control liquid pressures to be discharged from the wheel cylinders at the time of pressure reduction control with the application of the ABS.

The return path control valves are normal close type solenoid valves and are provided on the liquid pressure return line so as to form a two-system liquid pressure flow for separately passing the liquid pressures to be discharged from the wheel cylinders and then unifying the liquid pressure. Accordingly, it is possible to eliminate a difference in pressure intensification gradient according to a difference in generation time of a braking pressure between the front and rear wheels at the time of the pressure reduction control.

The TCS liquid pressure supply line shares the liquid pressure supply line and supplies the liquid pressure of the master cylinder to the wheel cylinders through a high pressure switching valve, a motor, and a suction pump at the time of implementation of a TCS for slipping control with no operation of the brake pedal.

The controller controls the valves provided on the hydraulic circuit, the motor, and the suction pump on the basis of wheel speed information measured by a wheel speed sensor at the time of normal braking, the ABS pressure reduction control, or the implementation of the TCS.

The liquid pressure supply line may include a head liquid pressure supply line, ● a front left wheel liquid pressure supply line, and a rear right wheel liquid pressure supply line. The head liquid pressure supply line extends from the master cylinder. The front left wheel liquid pressure supply line is connected to the head liquid pressure supply line and a wheel cylinder of a front left wheel, and has a unidirectional check valve so as to receive the liquid pressure from the master cylinder. The rear right wheel liquid pressure supply line branches off from the head liquid pressure supply line, to which the front left wheel liquid pressure supply line is connected, is connected to a wheel cylinder of a rear right wheel, and has a unidirectional check valve so as to receive the liquid pressure from the master cylinder.

A front wheel supply path control valve may be provided on the front left wheel liquid pressure supply line so as to open/close the path, and a rear wheel supply path control valve may be provided on the rear right wheel liquid pressure supply line so as to open/close the path.

The liquid pressure supply line may be provided with a pressure setting valve that, when the liquid pressure exceeds a prescribed liquid pressure, returns an excessive liquid pressure to the master cylinder so as to keep the entire hydraulic line to a constant liquid pressure. The pressure setting valve may be provided on the head liquid pressure supply line before the front left wheel liquid pressure supply line and the rear right wheel liquid pressure supply line branch off.

The liquid pressure return line may include wheel cylinder liquid pressure return lines, a unified liquid pressure return line, a connection liquid pressure return line, and a discharge liquid pressure return line. The wheel cylinder liquid pressure return lines extend from the wheel cylinder of the front left wheel and the wheel cylinder of the rear right wheel, and have unidirectional check valves, respectively. The unified liquid pressure return line is formed by unifying the wheel cylinder liquid pressure return lines. The connection liquid pressure return line is connected between the unified liquid pressure return line and a suction pump, and has a unidirectional check valve, and to which an accumulator for temporarily storing the liquid pressure is connected. The discharge liquid pressure return line is connected to the liquid pressure supply line connected to the master cylinder so as to return the liquid pressure pumped from the suction pump to the master cylinder.

The discharge liquid pressure return line may be connected to the liquid pressure supply lines that are respectively formed from master cylinder to the wheel cylinders of the front left wheel and rear right wheel. Further, the discharge liquid pressure return line may be located between the front wheel and rear wheel supply path control valves provided on the liquid pressure supply lines and the pressure setting valve.

Front wheel and rear wheel return path control valves may be provided in the wheel cylinder liquid pressure return lines, respectively, so as to open/close the paths, and a unified return path control valve may be provided on the connection liquid pressure return line connected to the unified liquid pressure return line so as to open/close the path.

The TCS liquid pressure supply line may branch off from the liquid pressure supply line extending from the master cylinder, may be connected to the liquid pressure return line connected to a previous stage of the suction pump, and may be connected to the liquid pressure supply line through the liquid pressure supply line extending from the suction pump, thereby forming the hydraulic circuit.

As the braking hydraulic circuit formed between the master cylinder and the wheel cylinders of the front left wheel and rear right wheel, a braking hydraulic circuit may be formed between the master cylinder and wheel cylinders of a front right wheel and a rear left wheel, and the suction pumps respectively provided in the braking hydraulic circuits may be driven by the single motor.

BRIEF DESCRIPTION OF THE DRAWINGS

For a better understanding of the nature and objects of the present invention, reference should be made to the following detailed description with the accompanying drawings, in which.

DETAILED DESCRIPTIONS OF THE PREFERRED EMBODIMENTS

Hereinafter, an embodiment of the present invention will be described in detail with reference to the accompanying drawings.

Figure 1:
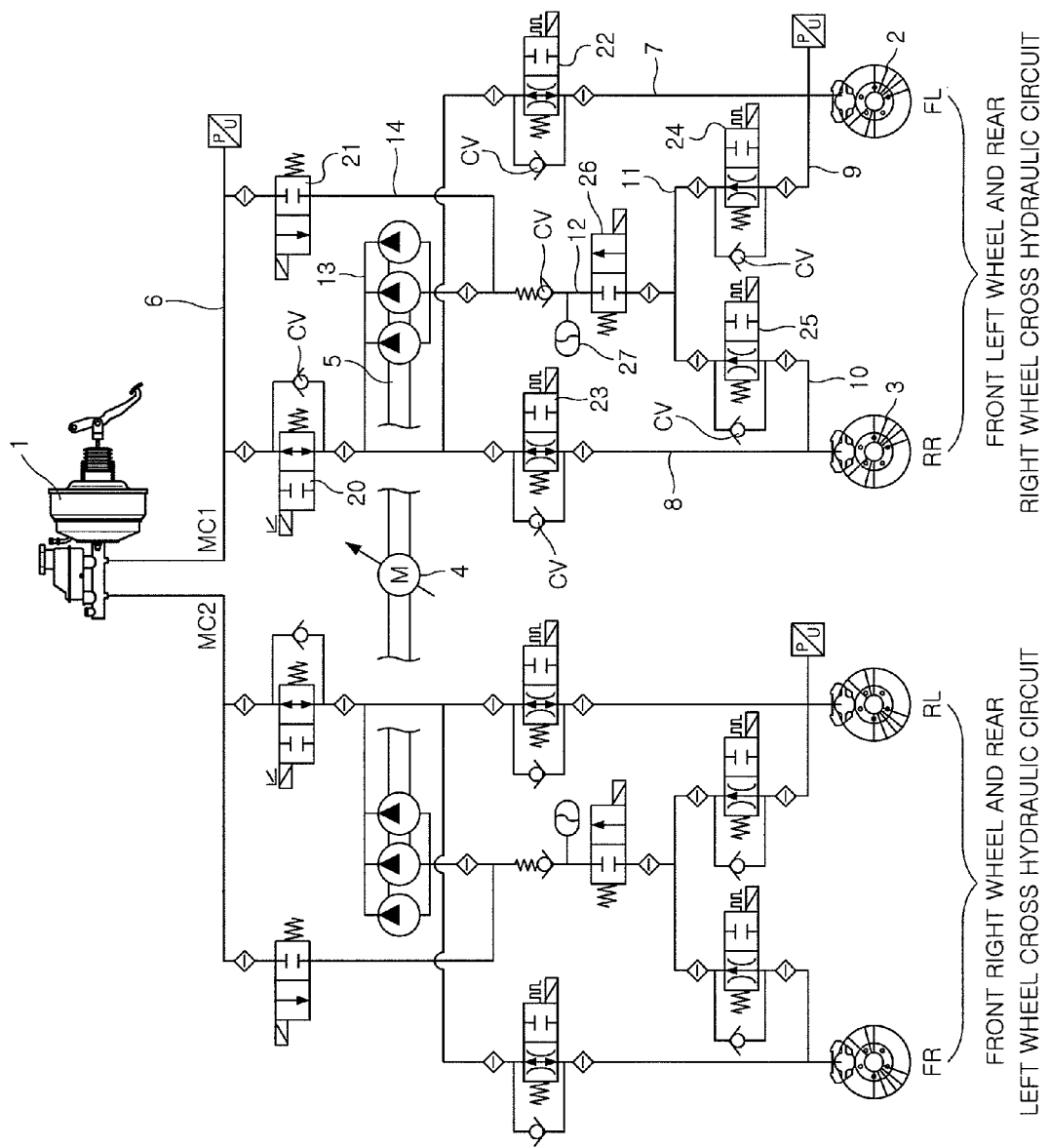
FIG. 1 is a diagram showing the configuration of a braking hydraulic circuit for controlling linear pressure reduction of a front/rear wheel braking liquid pressure and solving a difference in gradient of the front/rear wheel braking liquid pressure according to an embodiment of the present invention.

FIG. 1 is a diagram showing the configuration of a braking hydraulic circuit for controlling linear pressure reduction of a front/rear wheel braking liquid pressure and solving a difference in gradient of the front/rear wheel braking liquid pressure according to an embodiment of the present invention. The braking hydraulic circuit according to the embodiment of the present invention includes a liquid pressure supply line, supply path control valves, a liquid pressure return line, return path control valves, and a TCS liquid pressure supply line 14.

The liquid pressure supply line supplies a liquid pressure from a master cylinder 1 to wheel cylinder 2 and 3 of wheels at the time of normal braking with no application of an ABS according to an operation of a brake pedal by a driver.

The supply path control valves are provided on the liquid pressure supply line so as to control a flow of the liquid pressure to be supplied from master cylinder 1 to wheel cylinders 2 and 3 of the wheels.

The liquid pressure return line controls liquid pressures to be discharged from wheel cylinders 2 and 3 at the time of pressure reduction control with the application of the ABS (Antilock Brake System).

The return path control valves are normal close type solenoid valves and are provided on the liquid pressure return line so as to form a two-system liquid pressure flow for separately passing the liquid pressures discharged from wheel cylinders 2 and 3 and then unifying the liquid pressures, such that a difference in pressure intensification gradient according to a difference in generation time of a braking pressure between front and rear wheels at the time of the pressure reduction control is eliminated.

TCS liquid pressure supply line 14 shares the liquid pressure supply line so as to supply the liquid pressure of master cylinder 1 to wheel cylinders 2 and 3 through a high pressure switching valve 21, a motor 4, and a suction pump 5 at the time of implementation of a TCS for skid control with no operation of the brake pedal.

The braking hydraulic circuit according to the embodiment of the present invention further includes a controller that controls the valves provided on the hydraulic circuit, motor 4, and suction pump 5 on the basis of wheel speed information measured by a wheel speed sensor at the time of normal braking, the ABS pressure reduction control, or the implementation of the TCS.

Although a case where the braking hydraulic circuit according to the embodiment of the present invention is formed between master cylinder 1 and wheel cylinders of front left and rear right wheels FL and RR is described, a braking hydraulic circuit can be formed between master cylinder 1 and wheel cylinders of front right and rear left wheels FR and RL. This braking hydraulic circuit also uses the same hydraulic line and the same valves and suction pump. Motor 4 drives the suction pumps respectively mounted on both hydraulic circuits. That is, the same braking hydraulic circuits are formed between master cylinder 1 and the wheel cylinders of the front left and rear right wheels FL and RR and between master cylinder 1 and the wheel cylinders of the front right and rear left wheels FR and RL. Accordingly, hereinafter, one braking hydraulic circuit will be described.

The liquid pressure supply line constituting the braking hydraulic circuit includes a head liquid pressure supply line 6 that extends from an outlet port of master cylinder 1, a front left wheel liquid pressure supply line 7 that is connected to head liquid pressure supply line 6 and wheel cylinder 2 of the front left wheel, and has a unidirectional check valve CV so as to receive the liquid pressure from master cylinder 1, and a rear right wheel liquid pressure supply line 8 that is connected to head liquid pressure supply line 6 and wheel cylinder 3 of the rear right wheel, and has a unidirectional check valve CV so as to receive the liquid pressure from master cylinder 1.

At this time, liquid pressure supply lines 6, 7, and 8 are connected through branch pipes at joints and branches.

The supply path control valves provided on the liquid pressure supply line include a front wheel supply path control valve 22 that is provided on front left wheel liquid pressure supply line 7 connected to head liquid pressure supply line 6 extending from the port of master cylinder 1 so as to open/close the path, and a rear wheel supply path control valve 23 that is provided on rear right wheel liquid pressure supply line 8 connected to head liquid pressure supply line 6 extending from the port of master cylinder 1 so as to open/close the path.

Here, control valves 22 and 23 all are normal open type solenoid valves.

The liquid pressure supply line is provided with a pressure setting valve 20 (TCV) that, when the liquid pressure exceeds a prescribed liquid pressure, returns an excessive liquid pressure to master cylinder 1 and keeps the entire hydraulic line to a constant liquid pressure.

The liquid pressure return line includes wheel cylinder liquid pressure return lines 9 and 10 that extend from wheel cylinder 2 of the front left wheel and wheel cylinder 3 of the rear right wheel and have unidirectional check valves CV, respectively, a unified liquid pressure return line 11 that is formed by unifying said wheel cylinder liquid pressure return lines 9 and 10, a connection liquid pressure return line 12 that is connected between unified liquid pressure return line 11 and suction pump 5 and has a unidirectional check valve CV, and to which an accumulator 27 for temporarily storing the liquid pressure is connected, and a discharge liquid pressure return line 13 that is connected to the liquid pressure supply line connected to master cylinder 1 so as to return the liquid pressure pumped from suction pump 5 toward master cylinder 1.

Discharge liquid pressure return line 13 is connected to the liquid pressure supply lines that are respectively formed between master cylinder 1 and wheel cylinders 2 and 3 of the front left wheel and rear right wheel. Joints are located between front wheel and rear wheel supply path control valves 22 and 23 and pressure setting valve 20 (TCV) for keeping the braking hydraulic circuit to a constant liquid pressure. This is to supply a braking liquid pressure to wheel cylinders 2 and 3 through discharge liquid pressure return line 13 at the time of TCS implementation.

The return path control valves provided on the liquid pressure return line include front wheel and rear wheel return path control valves 24 and 25 that are provided in wheel cylinder liquid pressure return lines 9 and 10 respectively extending from wheel cylinders 2 and 3 of the front left wheel and rear right wheel so as to open/close the paths, and a unified return path control valve 26 that is provided on connection liquid pressure return line 12 connected to unified liquid pressure return line 11 extending from control valves 24 and 25 and being unified as a single line.

Here, front wheel and rear wheel return path control valves 24 and 25 and unified return path control valve 26 all are normal close type solenoid valves.

Liquid pressure supply lines 9, 10, 11, 12, and 13 are connected through branch pipes at joints or branches, if necessary.

TCS liquid pressure supply line 14 supplies the liquid pressure that is not directly supplied from master cylinder 1 to wheel cylinders 2 and 3 at the time of TCS implementation for skid control with no operation of the brake pedal. TCS liquid pressure supply line 14 branches off from the liquid pressure supply line extending from the port of master cylinder 1 and is connected to suction pump 5 to be connected to the liquid pressure return line.

At this time, TCS liquid pressure supply line 14 is connected to connection liquid pressure return line 12 that connects unified return path control valve 26 and suction pump 5. The connection position is set at the back of unidirectional check valve CV provided on connection liquid pressure return line 12. Then, the liquid pressure introduced through TCS liquid pressure supply line 14 does not reversely flow.

Accordingly, TCS liquid pressure supply line 14 forms a hydraulic circuit for supplying the liquid pressure through the liquid pressure return line, suction pump 5, the liquid pressure supply line, and wheel cylinders 2 and 3.

TCS liquid pressure supply line 14 is provided with a high pressure switching valve 21 that is opened so as to cause the liquid pressure of master cylinder 1 to be supplied to wheel cylinders 2 and 3 through motor 4 and suction pump 5 at the time of the TCS implementation.

Hereinafter, the operation of the braking hydraulic circuit according to the embodiment of the present invention will be described in detail with reference to the accompanying drawings.

According to the embodiment of the present invention, for pressure reduction control at the time of the operation of the ABS, it is possible to implement PWM SOL through a combination of NO SOL (Normal Open type SOLenoid valve) and NC SOL (Normal Close type SOLenoid valve) as on/off type solenoid valves, not braking hydraulic circuit control using PWM SOL (Pulse Width Modulation type SOLenoid valve).

That is, according to the embodiment of the invention, on the liquid pressure return line formed between the wheel cylinders and the master cylinder, normal open type solenoid valves and normal close type solenoid valves are provided so as to form a two-system liquid pressure flow for separately passing the liquid pressures to be discharged from the wheel cylinders and then unifying the liquid pressures. Further, an accumulator that temporarily stores the discharged liquid pressure is provided. Accordingly, a braking operation can be rapidly performed during the pressure reduction control of the ABS or TCS, and a difference in pressure intensification gradient according to a difference in generation time of a braking pressure between the front and rear wheels can be eliminated. Therefore, braking unstability can be solved.

The operation of the braking hydraulic circuit according to the embodiment of the present invention will be described according to normal braking, the pressure reduction control according to the operation of the ABS, and the TCS implementation for skid control.

Figure 2:
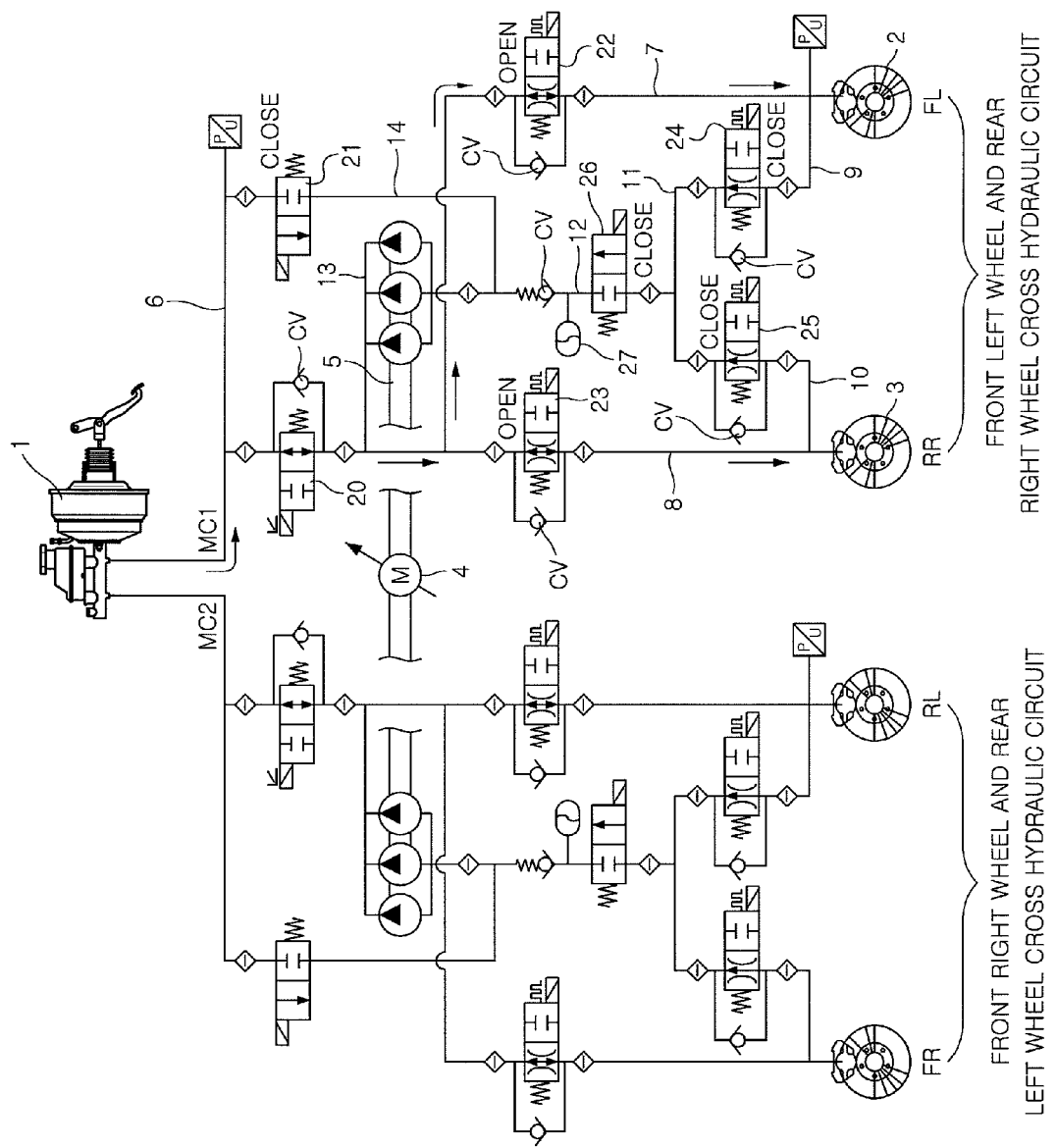
FIG. 2 is a diagram of a flow of a liquid pressure at the time of normal braking with no application of an ABS in a case where the braking hydraulic circuit according to the embodiment of the present invention is used.

First, at the time of normal braking, as shown in FIG. 2, as the driver operates the brake pedal, a liquid pressure generated by a booster and master cylinder 1 is supplied to the wheel cylinders of the wheels FL, RR, FR, and RL through the braking hydraulic circuit, thereby performing braking.

A detailed description will be given by way of a liquid pressure supply line that is a hydraulic circuit from master cylinder 1 to wheel cylinders 2 and 3 of the front left wheel and rear right wheel, as shown in FIG. 2. That is, the liquid pressure generated by master cylinder 1 is distributed, through head liquid pressure supply line 6, to front left wheel liquid pressure supply line 7 and rear right wheel liquid pressure supply line 8 connected to head liquid pressure supply line 6. Then, the liquid pressures distributed to front left wheel liquid pressure supply line 7 and rear right wheel liquid pressure supply line 8 is introduced into wheel cylinder 2 of the front left wheel and wheel cylinder 3 of the rear right wheel, such that the braking operation is performed.

At this time, the controller that controls the hydraulic circuit opens front wheel and rear wheel supply path control valves 22 and 23 of an NO SOL (Normal Open type SOLenoid valve) type respectively provided on front left wheel and rear right wheel liquid pressure supply lines 7 and 8, and closes front wheel and rear wheel return path control valves 24 and 25 and unified return path control valve 26 of an NC SOL (Normal Close type SOLenoid valve) type provided in the liquid pressure return line.

With no implementation of the TCS, motor 4 and suction pump 5 are not driven, and high pressure switching valve 21 provided in TCS liquid pressure supply line 14 is kept in a closed state.

The controller performs pressure reduction control according to the operation of the ABS. Specifically, the controller calculates a difference from a vehicle speed on the basis of information detected by a wheel speed sensor mounted on the wheel and then, if the difference does not fall within a prescribed control range, performs pressure reduction control in order to reduce the liquid pressures to be applied to wheel cylinders 2 and 3 of the front left wheel and rear right wheel. At the time of the pressure reduction control, the controller drives motor 4 and suction pump 5 and performs on/off control of NO SOL type valves 22 and 23 and NC SOL type valves 24, 25, and 26 provided in the hydraulic circuit. Accordingly, the pressure reduction control is performed with no difference in pressure intensification gradient between the front and rear wheels.

Upon braking, as shown in FIG. 2, the controller closes front wheel and rear wheel supply path control valves 22 and 23 of the NO SOL type provided in the liquid pressure supply line, and performs control to form a flow of the liquid pressure in the liquid pressure return line such that the liquid pressure is not supplied to wheel cylinders 2 and 3 of the front left wheel and rear right wheel, to which the liquid pressure is supplied from master cylinder 1, any more, and a predetermined liquid pressure is discharged.

Figure 3:
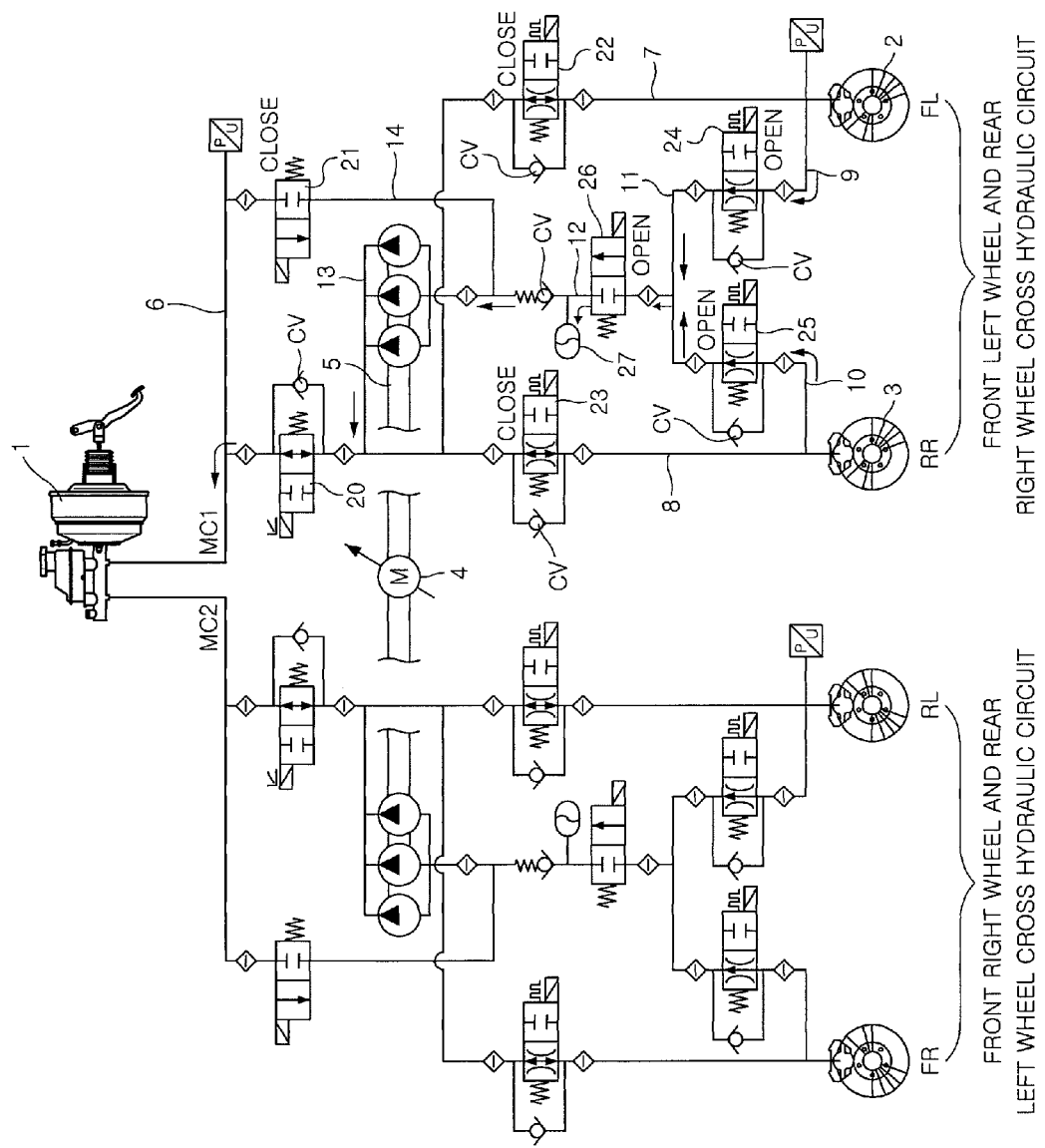
FIG. 3 is a diagram showing a flow of a liquid pressure at the time of pressure reduction control with the application of the ABS in a case where the braking hydraulic circuit according to the embodiment of the present invention is used.

That is, as shown in FIG. 3, if the controller opens front wheel and rear wheel return path control valves 24 and 25 of the NC SOL type respectively provided in the wheel cylinder liquid pressure return lines 9 and 10 of wheel cylinders 2 and 3 of the front left wheel and rear right wheel, the liquid pressures to be discharged from wheel cylinders 2 and 3 of the front left wheel and rear right wheel are collected in unified liquid pressure return line 11 through return path control valves 24 and 25.

Next, the liquid pressure introduced into unified liquid pressure return line 11 passes through unified return path control valve 26 of the NC SOL type that is opened by the controller, and is stored, through connection liquid pressure return line 12, in accumulator 27 for temporarily storing the liquid pressure. Then, in a state where the supply of the liquid pressure is blocked, the internal liquid pressures are discharged from wheel cylinders 2 and 3 of the front left wheel and rear right wheel to accumulator 27 through the liquid pressure return line. Accordingly, a rotation speed of a wheel disk increases due to the reduced liquid pressures of wheel cylinders 2 and 3 of the front left wheel and rear right wheel.

At this time, when the liquid pressure in the braking hydraulic circuit exceeds a prescribed liquid pressure, the controller drives motor 4 and suction pump 5 and returns the liquid pressure temporarily stored in accumulator 27 and the liquid pressure discharged through the liquid pressure return line to master cylinder 1 through pressure setting valve 20. Therefore, the liquid pressure in the braking hydraulic circuit is constantly kept to the prescribed liquid pressure.

Next, the controller calculates the difference from the vehicle speed on the basis of information about the wheel speed detected by the wheel speed sensor again. Then, if the rotation speed of the wheel excessively increases, the controller performs the braking operation again in order to prevent the excessive increase of the rotation speed. Specifically, the controller drives motor 4 and suction pump 5 and supplies the liquid pressures to wheel cylinders 2 and 3 of the front left wheel and rear right wheel through the liquid pressure supply line.

Figure 4:
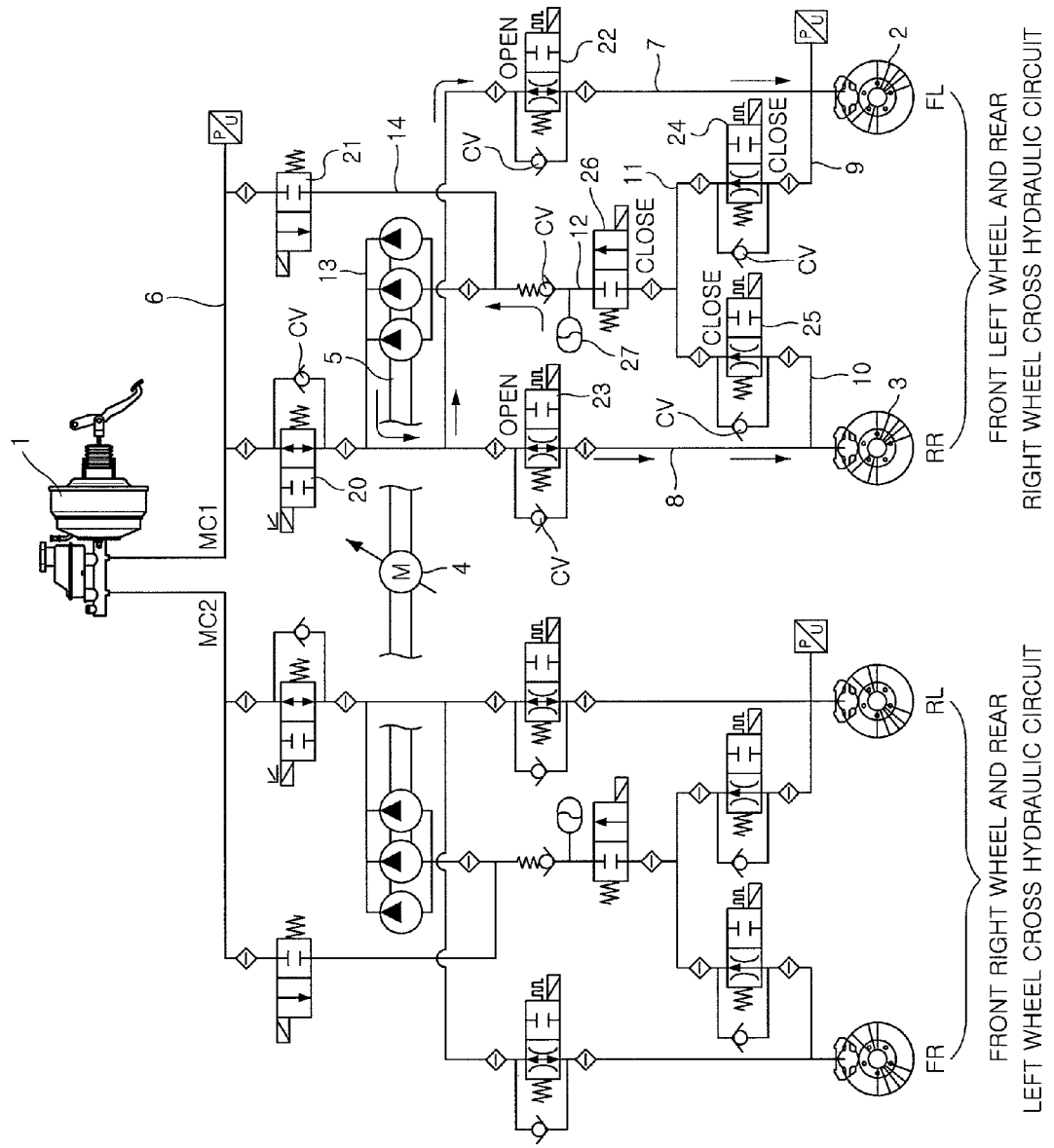
FIG. 4 is a diagram showing a flow of a liquid pressure when a braking operation is performed again after the pressure reduction control with the application of the ABS in a case where the braking hydraulic circuit according to the embodiment of the present invention is used.

That is, as shown in FIG. 4, the controller closes front wheel and rear wheel return path control valves 24 and 25 and unified return path control valve 26 of the NC SOL type provided in the liquid pressure return line. Simultaneously, the controller drives motor 4 and suction pump 5 and opens front wheel and rear wheel supply path control valves 22 and 23 of the NO SOL type provided in the liquid pressure supply line. Then, the liquid pressure pumped from the liquid suction pump 5 is distributed into front left wheel and rear right wheel liquid pressure supply lines 7 and 8 and then the distributed liquid pressures are respectively introduced to wheel cylinders 2 and 3 of the front left wheel and rear right wheel.

Accordingly, wheel cylinders 2 and 3 of the front left wheel and rear right wheel perform the braking operation again, and the wheel speed is reduced. Then, the controller acquires information about the wheel speed through the wheel speed sensor again, judges where or not to supply the liquid pressure for braking or to discharge the liquid pressure for speed reduction, and repeats the above-described operation, if necessary.

At the time of normal braking or the implementation of the pressure reduction control according to the operation of the ABS, if the operation of the brake pedal by the driver is released, the controller performs control according to the brake pedal release signal such that the liquid pressure in the braking hydraulic circuit is kept constant.

That is, the controller that receives the brake pedal release signal closes front wheel and rear wheel supply path control valves 22 and 23 of the NO SOL type provided in the liquid pressure supply line, and simultaneously closes front wheel and rear wheel return path control valves 24 and 25 and unified return path control valve 26 of the NC SOL type provided in the liquid pressure return line.

Accordingly, the liquid pressures of the wheel cylinders 2 and 3 of the front left wheel and rear right wheel are discharged through wheel cylinder liquid pressure return lines 9 and 10 and unified liquid pressure return line 11. Then, the liquid pressures discharged to the discharge liquid pressure return line return to master cylinder 1, excluding the liquid pressure for keeping the prescribed liquid pressure of the braking hydraulic circuit.

At this time, the prescribed liquid pressure of the braking hydraulic circuit is kept through pressure setting valve 20. That is, only when a liquid pressure larger than the prescribed liquid pressure is formed through liquid pressure return lines 9, 10, 11, 12, and 13, pressure setting valve 20 is opened so as to solve a difference from the prescribed liquid pressure, and then the liqUid pressure larger than the prescribed liquid pressure returns to master cylinder 1. Accordingly, after braking is released, the braking hydraulic circuit is kept to the prescribed liquid pressure.

Meanwhile, in a state where the driver does not operate the brake pedal, when the TCS is implemented for skid or slip control, the controller calculates a slip ratio of a tire using the vehicle speed information input through the wheel speed sensor, then drive motor 4 and suction pump 5, and subsequently forms a hydraulic circuit between master cylinder 1 and wheel cylinders 2 and 3 of the front left wheel and rear right wheel through TCS liquid pressure supply line 14 and front left wheel and rear right wheel liquid pressure supply lines 7 and 8.

Figure 5:
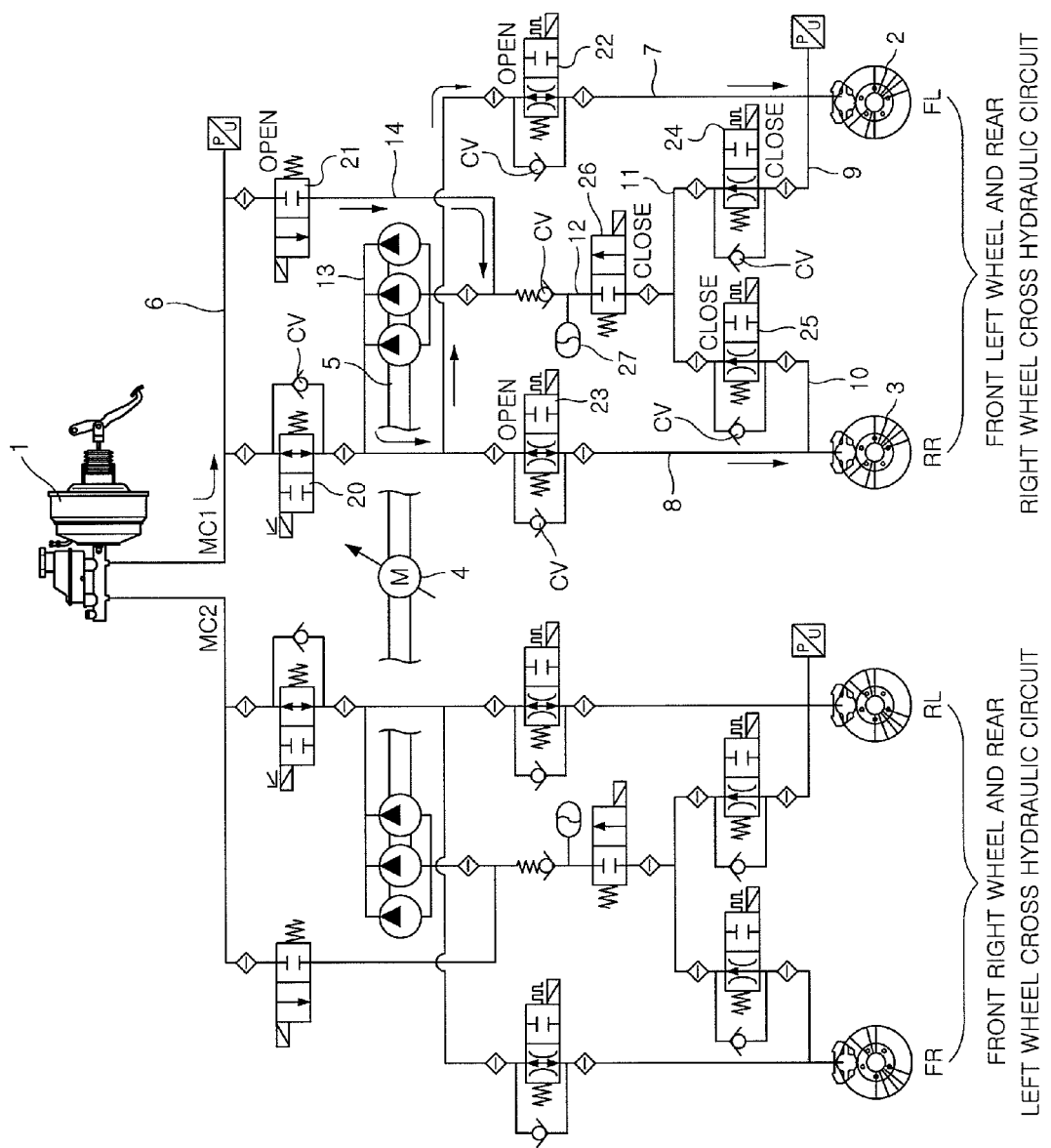
FIG. 5 is a diagram showing a flow of a liquid pressure when a braking hydraulic pressure is supplied at the time of implementation of a TCS with no operation of a brake pedal in a case where the braking hydraulic circuit according to the embodiment of the present invention is used.

That is, as shown in FIG. 5, the controller closes front wheel and rear wheel return path control valves 24 and 25 and unified return path control valve 26 of the NC SOL type in the liquid pressure return line, opens front wheel and rear wheel supply path control valves 22 and 23 of the NO SOL type in the liquid pressure supply line, and opens high pressure switching valve 21 provided in TCS liquid pressure supply line 14, thereby forming the hydraulic circuit. Through the hydraulic circuit formed in such a manner, the liquid pressure pumped by motor 4 and suction pump 5 is introduced into wheel cylinders 2 and 3 of the front left wheel and rear right wheel, and thus the braking operation is performed.

At the time of the TCS implementation, when the wheel speed is reduced to a prescribed rotation speed or less on the basis of the slip ratio information of the wheel, the controller performs the pressure reduction control for reducing the braking liquid pressure. This is performed in the same manner as at the time of the pressure reduction control according to the operation of the ABS, and thus the description thereof will be omitted.

Although the braking operation and the pressure reduction control have been described using the hydraulic circuit formed master cylinder 1 between wheel cylinders of front left wheel and rear right wheel FL and RR, a braking hydraulic circuit that is to be formed between master cylinder 1 and the wheel cylinders of front right wheel and rear left wheel FR and RL is the same as the braking hydraulic circuit that is formed between master cylinder 1 and wheel cylinders of front left wheel and rear right wheel FL and RR. Accordingly, the description of the operation of the braking hydraulic circuit that is formed between master cylinder 1 and wheel cylinders of front right wheel and rear left wheel FR and RL will be omitted.

As described above, according to the embodiments of the present invention, on the liquid pressure return line that is formed between the wheel cylinders and the master cylinder, the normal open type solenoid valves and the normal close type solenoid valves are provided so as to form the two-system liquid pressure flow for separately passing the liquid pressures to be discharged from the wheel cylinders and then unifying the liquid pressures. Therefore, at the time of the implementation of the ABS or the TCS, precise pressure reduction control can be preformed.

According to the embodiment of the present invention, the pressure reduction control according to the operation of the ABS or the TCS is implemented using the normal close type solenoid valves. Therefore, costs for the development of a separate PWM type solenoid valve are not required, and thus an advantage can be obtained in terms of the costs.

According to the embodiment of the present invention, on the liquid pressure return line formed between the wheel cylinders and the master cylinder, the normal close type solenoid valves are formed double so as to form a two-system liquid pressure flow, and the accumulator for temporarily storing the discharge liquid pressure is provided. Therefore, the braking operation can be rapidly performed during the pressure reduction control. As a result, the braking operation can be performed with no difference in pressure intensification gradient according to a difference in generation time of the braking pressure between the front and rear wheels.

What is claimed is:

1. A braking hydraulic circuit that controls linear reduction of a front/rear wheel braking liquid pressure and solves a difference in gradient of the front/rear wheel braking liquid pressure in a vehicle, the braking hydraulic circuit comprising:

a liquid pressure supply line that supplies a liquid pressure from a master cylinder to wheel cylinders of wheels upon braking according to an operation of a brake pedal by a driver and at normal braking with no application of an ABS (Antilock Brake System);

supply path control valves that are normal open type solenoid valves and are provided on said liquid pressure supply line to control a flow of a hydraulic pressure to be supplied from the master cylinder to the wheel cylinders of the wheels;

a liquid pressure return line that is formed to control liquid pressures to be discharged from the wheel cylinders at a time of pressure reduction control with the an application of the ABS;

return path control valves that are normal close type solenoid valves and are provided on said liquid pressure return line to form a two-system liquid pressure flow that separately passes liquid pressures to be discharged from the wheel cylinders and then unifies the liquid pressures, such that a difference in pressure intensification gradient is eliminated according to a difference in generation time of a braking pressure between the front/rear wheels at the time of the pressure reduction control;

a TCS liquid pressure supply line that shares the liquid pressure supply line and supplies the liquid pressure of the master cylinder to the wheel cylinders through a high pressure switching valve, a motor, and a suction pump at the a time of implementation of a TCS (Traction Control System) to control tire-slipping with no operation of the brake pedal; and a controller that controls the valves provided on the hydraulic circuit, the motor, and the suction pump based on wheel speed information measured by a wheel speed sensor at the time of normal braking, the ABS pressure reduction control, or the implementation of the TCS, wherein the liquid pressure return line comprises:

wheel cylinder liquid pressure return lines that extend from the wheel cylinder of the front left wheel and the wheel cylinder of the rear right wheel, and have unidirectional check valves, respectively;

a unified liquid pressure return line that is formed by unifying said wheel cylinder liquid pressure return lines;

a connection liquid pressure return line that is connected between said unified liquid pressure return line and a suction pump, and has a unidirectional check valve, and to which an accumulator that temporarily stores the liquid pressure is connected; and a discharge liquid pressure return line that is connected to the liquid pressure supply lines connected to the master cylinder to return the liquid pressure pumped from said suction pump to the master cylinder, and wherein front wheel and rear wheel return path control valves are provided in said wheel cylinder liquid pressure return lines, respectively, to open/close the wheel cylinder liquid pressure return lines, and a unified return path control valve is provided on the connection liquid pressure return line connected to said unified liquid pressure return line.

2. The braking hydraulic circuit as defined in claim 1, wherein said liquid pressure supply line includes:

a head liquid pressure supply line that extends from the master cylinder;

a front left wheel liquid pressure supply line that is connected to said head liquid pressure supply line and a wheel cylinder of a front left wheel, and has a unidirectional check valve so as to receive the liquid pressure from the master cylinder; and a rear right wheel liquid pressure supply line that branches off from the head liquid pressure supply line, to which said front left wheel liquid pressure supply line is connected, is connected to a wheel cylinder of a rear right wheel, and has a unidirectional check valve receive the liquid pressure from the master cylinder.

3. The braking hydraulic circuit as defined in claim 2, wherein a front wheel supply path control valve is provided on said front left wheel liquid pressure supply line so as to open/close the front left wheel liquid pressure supply line, and a rear wheel supply path control valve is provided on said rear right wheel liquid pressure supply line so as to open/close the rear right wheel liquid pressure supply line.

4. The braking hydraulic circuit as defined in claim 2, wherein said liquid pressure supply line is provided with a pressure setting valve that, when the liquid pressure exceeds a prescribed liquid pressure, returns an excessive liquid pressure to the master cylinder to keep an entire hydraulic line to at a constant liquid pressure.

5. The braking hydraulic circuit as defined in claim 4, wherein said pressure setting valve is provided on head liquid pressure supply line before the front left wheel liquid pressure supply line and the rear right wheel liquid pressure supply line branch off.

6. The braking hydraulic circuit as defined in claim 1, wherein said discharge liquid pressure return line is connected to the liquid pressure supply lines that are respectively formed from the master cylinder to the wheel cylinders of the front left wheel and the rear right wheel.

7. The braking hydraulic circuit as defined in claim 6, wherein said discharge liquid pressure return line is located between the front wheel and rear wheel supply path control valves provided on the liquid pressure supply lines and the pressure setting valve.

8. The braking hydraulic circuit as defined in claim 1, wherein said TCS liquid pressure supply line branches off from the liquid pressure supply line extending from the master cylinder, is connected to the liquid pressure return line connected to a previous stage of the suction pump, and is connected to the liquid pressure supply line through the liquid pressure supply line extending from the suction pump, thereby forming the hydraulic circuit.

9. The braking hydraulic circuit as defined in claim 1, wherein, as the braking hydraulic circuit formed between said master cylinder and the wheel cylinders of the front left wheel and rear right wheel, a braking hydraulic circuit is formed between the master cylinder and wheel cylinders of a front right wheel and a rear left wheel, and the suction pumps respectively provided in said braking hydraulic circuits are driven by the a single motor.

* * * * *